United States Patent
Bae et al.

(10) Patent No.: US 12,125,160 B1
(45) Date of Patent: Oct. 22, 2024

(54) THREE-DIMENSIONAL VISUALIZATION SYSTEM FOR COMPLEX HAZARD

(71) Applicant: AGENCY FOR DEFENSE DEVELOPMENT, Daejeon (KR)

(72) Inventors: Jaekyung Bae, Daejeon (KR); Goonhyeok Kim, Daejeon (KR); MinKun Kim, Daejeon (KR); Sangmyeon Lee, Daejeon (KR); Jiwoong Heo, Daejeon (KR); Heesoo Jung, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/545,745

(22) Filed: Dec. 19, 2023

(30) Foreign Application Priority Data

May 18, 2023 (KR) .......................... 10-2023-0064609

(51) Int. Cl.
G06T 19/00 (2011.01)
G01C 21/20 (2006.01)
G06F 3/01 (2006.01)
G06F 3/14 (2006.01)
G06T 17/05 (2011.01)

(52) U.S. Cl.
CPC ............ *G06T 19/006* (2013.01); *G06F 3/011* (2013.01); *G06F 3/1454* (2013.01); *G06T 17/05* (2013.01); *G01C 21/20* (2013.01); *G06T 2200/24* (2013.01); *G06T 2210/24* (2013.01); *G06T 2219/024* (2013.01)

(58) Field of Classification Search
CPC ... G06T 19/006; G06T 2200/24; G06T 17/05; G06T 2210/24; G06T 2219/024; G06F 3/1454; G06F 3/011; G01C 21/20
See application file for complete search history.

(56) References Cited

U.S. PATENT DOCUMENTS

| | | | |
|---|---|---|---|
| 2018/0190017 A1* | 7/2018 | Mendez | ................. G06T 17/20 |
| 2018/0365897 A1* | 12/2018 | Pahud | .................. G06T 19/006 |
| 2020/0155882 A1 | 5/2020 | Tohidi et al. | |
| 2020/0175767 A1 | 6/2020 | Stivi et al. | |
| 2021/0019942 A1* | 1/2021 | Ophir | ................. G06F 3/04815 |

FOREIGN PATENT DOCUMENTS

| | | |
|---|---|---|
| KR | 10-2005-0116524 A | 12/2005 |
| KR | 10-1952607 B1 | 3/2019 |
| KR | 10-2020-0078074 A | 7/2020 |
| KR | 102332752 B1 | 11/2021 |
| KR | 10-2022-0058673 A | 5/2022 |
| KR | 20230035955 A | 3/2023 |

OTHER PUBLICATIONS

Bae, J., et al., "Visualization for digital information based on AR/MR for simulating CBR situation," Agency for Defense Development, Feb. 17, 2023, 2023 Korean Society of Chemical, Biological and Radiological Defense (KSCBRD) Spring, Conference Poster 23, 4 pages, Korean with English Abstract.

* cited by examiner

*Primary Examiner* — Muhammad N Edun
(74) *Attorney, Agent, or Firm* — Dorsey & Whitney LLP

(57) ABSTRACT

A three-dimensional (3D) visualization system for a complex hazard includes a central server system configured to collect 3D map information and complex hazard information to generate a 3D extended reality environment that is three-dimensionally rendered, and a visualization terminal capable of remotely communicating with the central server system and provided with a display configured to output the 3D extended reality environment.

19 Claims, 7 Drawing Sheets

THREE-DIMENSIONAL VISUALIZATION SYSTEM FOR COMPLEX HAZARD

CROSS-REFERENCE TO RELATED APPLICATION

This application claims the benefit of Korean Patent Application No. 10-2023-0064609 filed on May 18, 2023, in the Korean Intellectual Property Office, the entire disclosure of which is incorporated herein by reference for all purposes.

BACKGROUND

1. Field of the Invention

One or more embodiments relate to a three-dimensional (3D) visualization system for a complex hazard according to an embodiment.

2. Description of the Related Art

Augmented reality (AR), mixed reality (MR), and extended reality (XR) technologies are new types of technologies that combine the real world and the virtual world and these technologies are used in various fields such as medicine, education, manufacturing, construction, and entertainment fields. However, it is hard to find the use of the AR/MR/XR technologies for the purpose of early evacuation and response to complex dangerous situations.

Therefore, through the AR/MR/XR technologies in a digital twin space, it is necessary to provide a system capable of implementing various pieces of useful information such as pollution concentration data or an appropriate evacuation route in a three-dimensional (3D) form for each dangerous material, selecting data desired by a user, as necessary, implementing selected information as a virtual object in real time, and enabling intuitive 3D visualization for dangerous situations through the combination with the real world.

The above description is information the inventor(s) acquired during the course of conceiving the present disclosure, or already possessed at the time, and is not necessarily art publicly known before the present application was filed.

SUMMARY

An object according to an embodiment is to realize rapid evacuation and response to threat information formed from various colorless and odorless dangerous particulates, that are difficult to immediately identify, and is to provide a three-dimensional (3D) visualization system of a complex hazard capable of providing and sharing immediate and intuitive information of hazards through threat information 3D visualization, display of an appropriate evacuation route, and visualization of other auxiliary information in a digital twin space.

According to an aspect, there is provided a 3D visualization system for a complex hazard, the 3D visualization system including a central server system configured to collect 3D map information and complex hazard information to generate a 3D extended reality environment that is three-dimensionally rendered, and a visualization terminal capable of remotely communicating with the central server system and provided with a display configured to output the 3D extended reality environment.

The central server system may include a digital twin generator configured to process the 3D map information including 3D terrain and building information, and complex hazard information collected in relation to at least one or more pollutants, a graphic information processor configured to generate the 3D extended reality environment based on the 3D map information and the complex hazard information processed through the digital twin generator, and a central controller configured to set 3D output information to be output through the 3D extended reality environment formed by the graphic information processor, and share the 3D extended reality environment and the 3D output information with the visualization terminal.

The complex hazard information may collect at least one or more pieces of pollution information of fine dust, yellow dust, chemical, biological, and radiological pollution, and toxic gases from fire, and the digital twin generator may be configured to generate a computational fluid dynamics-based pollution prediction model based on the 3D map information and the complex hazard information.

The central controller may be capable of outputting the 3D extended reality environment, and configured to selectively control the 3D output information to be output in the same 3D visualization environment according to an environment of the display of the visualization terminal.

The 3D output information output in the 3D extended reality environment may include a 3D rendering map modeled based on the 3D map information, a hazard information overlay overlaid and output on the 3D rendering map based on the complex hazard information and the pollution prediction model, and a user interface (UI) output in the 3D extended reality environment to interact with other pieces of 3D output information.

The hazard information overlay may display a physical distribution of pollutant elements as 3D graphics on the 3D rendering map for each type of the pollutant elements in the complex hazard information.

The central controller may be configured to select the hazard information overlay overlaid to be output in the 3D extended reality environment among the pollutant elements in the complex hazard information.

The central controller may be configured to divide the 3D output information according to similarities and add each of the 3D output information in the unit of layers, and control each layer to be selectively output in the 3D extended reality environment.

The UI may include an input layer configured to enable output of the 3D rendering map or the hazard information overlay in the 3D extended reality environment and enable enlargement, reduction, rotation, and movement of the 3D output information in the 3D extended reality environment.

The central controller may be configured to generate control information including stepwise hazard zone information according to a degree and a location of pollution based on the 3D map information, the complex hazard information, and the pollution prediction model, and the 3D output information may further include a control information overlay overlaid to be identified on the 3D rendering map based on the control information.

The control information may further include route information according to a safe route and a dangerous route on the 3D map information through the central controller, and the control information overlay may visualize and output a movement path according to the route information on the 3D rendering map.

The central controller may be configured to set different pieces of route information to each visualization terminal as the control information, and in the control information overlay output from each visualization terminal, a movement path according to the route information set to each visualization terminal may be visualized and output.

The central controller may be configured to set the 3D output information to be output through at least some visualization terminals set among a plurality of visualization terminals differently from 3D output information to be output through other visualization terminals. The visualization terminal may further include an input device, and may be configured to generate manipulation information for selecting, enlarging, reducing, rotating, and moving a type of the 3D output information to be output in the 3D extended reality environment through the input device.

The visualization terminal may include a scanning device configured to recognize a surrounding situation and a user's hand, and the visualization terminal may be configured to generate the manipulation information through the user's hand recognized through the scanning device.

The central controller may be configured to perform synchronization so that the 3D output information to be output through some visualization terminals set among a plurality of visualization terminals is shared with each other, and perform synchronization so that manipulation information input from one of the set some visualization terminals is also applied to remaining visualization terminals.

A user of the visualization terminal may configure an independent manipulation environment by deviating from the synchronization of the manipulation information and not sharing own manipulation information, as needed.

When a plurality of visualization terminals among the visualization terminals belonging to a synchronized environment is located in a relatively adjacent space, the 3D output information may be output on the same 3D coordinates in the 3D extended reality environment based on relative location information between the plurality of visualization terminals.

The visualization terminal may be capable of selectively configuring items of pieces of information to be synchronized, may configure the 3D extended reality environment based on information set from the central controller using the 3D map information, the complex hazard information, and the 3D output information, and may be capable of performing independent manipulation and operation without sharing manipulation information in the 3D extended reality environment.

Additional aspects of example embodiments will be set forth in part in the description which follows and, in part, will be apparent from the description, or may be learned by practice of the disclosure.

According to the visualization system for the complex hazard according to an embodiment, 3D intuitive visualization may be achieved for dangerous situations in the 3D extended reality environment formed by combining 3D output information with the real world, and this may be simultaneously shared with a linked 3D outputter to smoothly plan and determine evacuation and response to complex hazard.

According to the visualization system for the complex hazard according to an embodiment, it is possible to rapidly and intuitively recognize a situation from complex hazards, which may be colorless and odorless, and smoothly evacuate and respond to the complex hazards, thereby expecting an effect of contributing to improving survivability of many targets.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
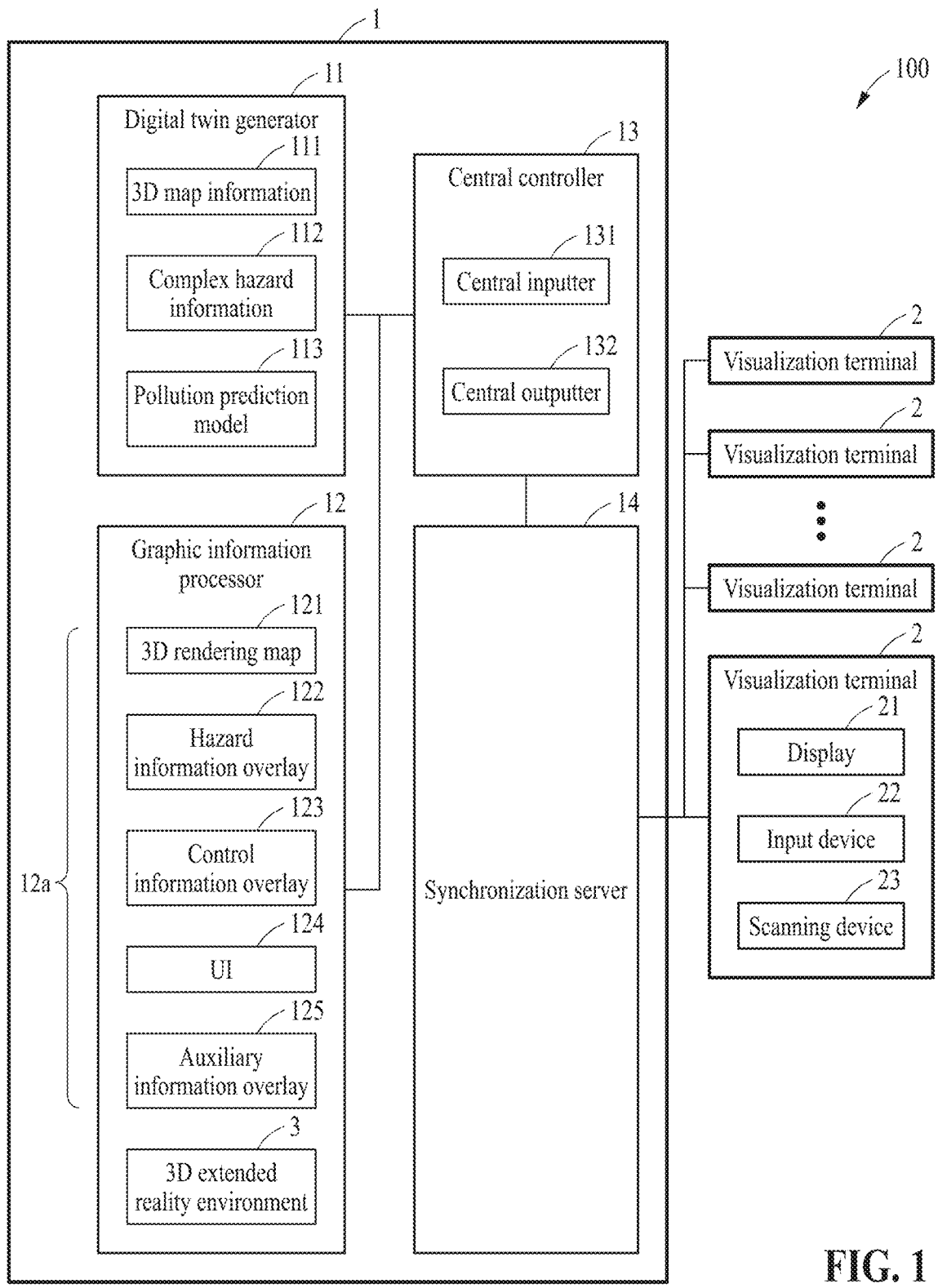
FIG. 1 is a block diagram of a three-dimensional (3D) visualization system for a complex hazard according to an embodiment.

Hereinafter, embodiments will be described in detail with reference to the accompanying drawings. The following description describes one of several aspects of the embodiments, and the following description forms part of the detailed description of the embodiments.

In the description of an embodiment, any detailed description of a well-known function or configuration is not included to clearly convey the gist of the present disclosure.

In addition, the terms or words used to describe the present disclosure and claims should not be construed in a conventional or dictionary meaning, and based on a principle that the inventors may properly define the concept of terms in order to best describe their invention, the terms or words should be construed as having meanings and concepts consistent with the technical idea of a three-dimensional (3D) visualization system for a complex hazard according to an embodiment.

Therefore, the embodiments described in the present disclosure and the configurations shown in the drawings are merely the most preferred embodiment of the 3D visualization system for the complex hazard according to an embodiment and do not represent all of technical ideas of the 3D visualization system for the complex hazard. Thus, it should be understood that there are various equivalents and modification examples to be replaceable at the time of filing the present disclosure.

Figure 2:
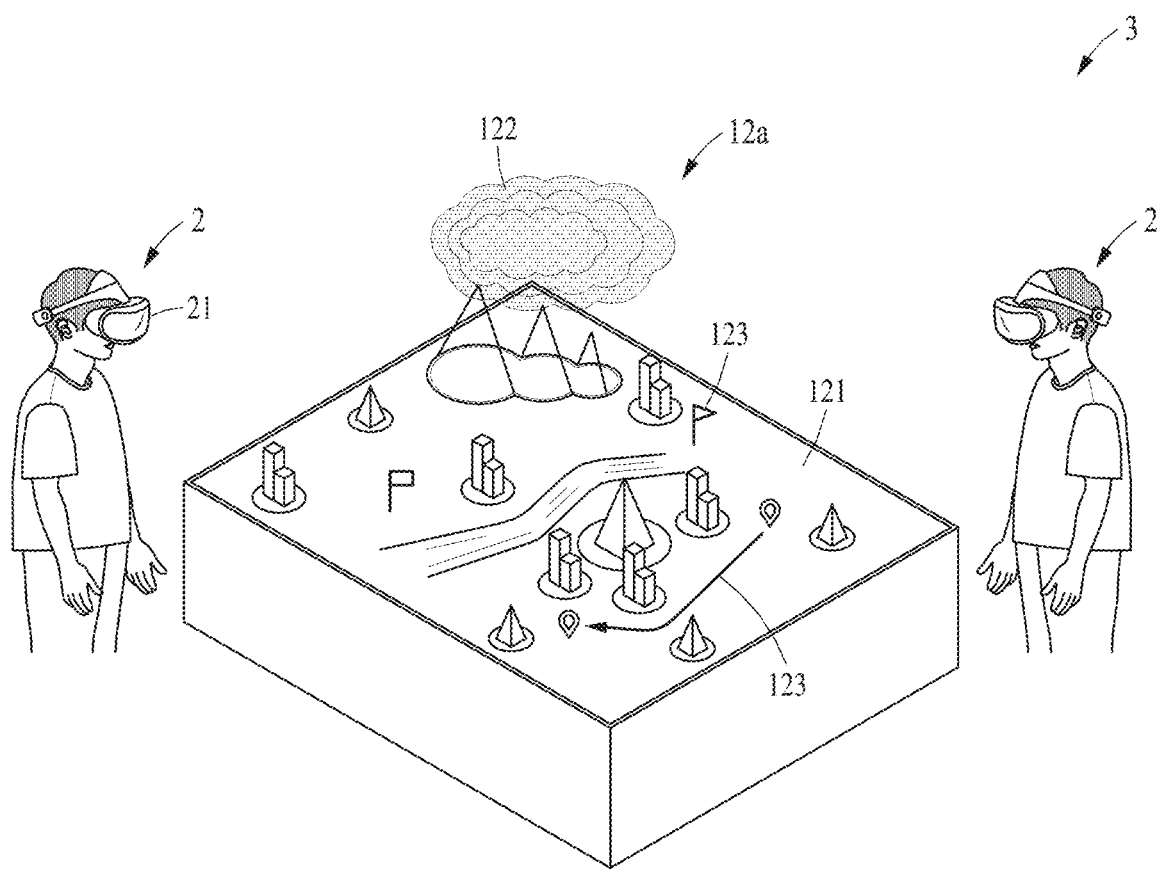
FIG. 2 is a diagram schematically illustrating a configuration of a 3D visualization system for a complex hazard according to an embodiment.
Figure 3:
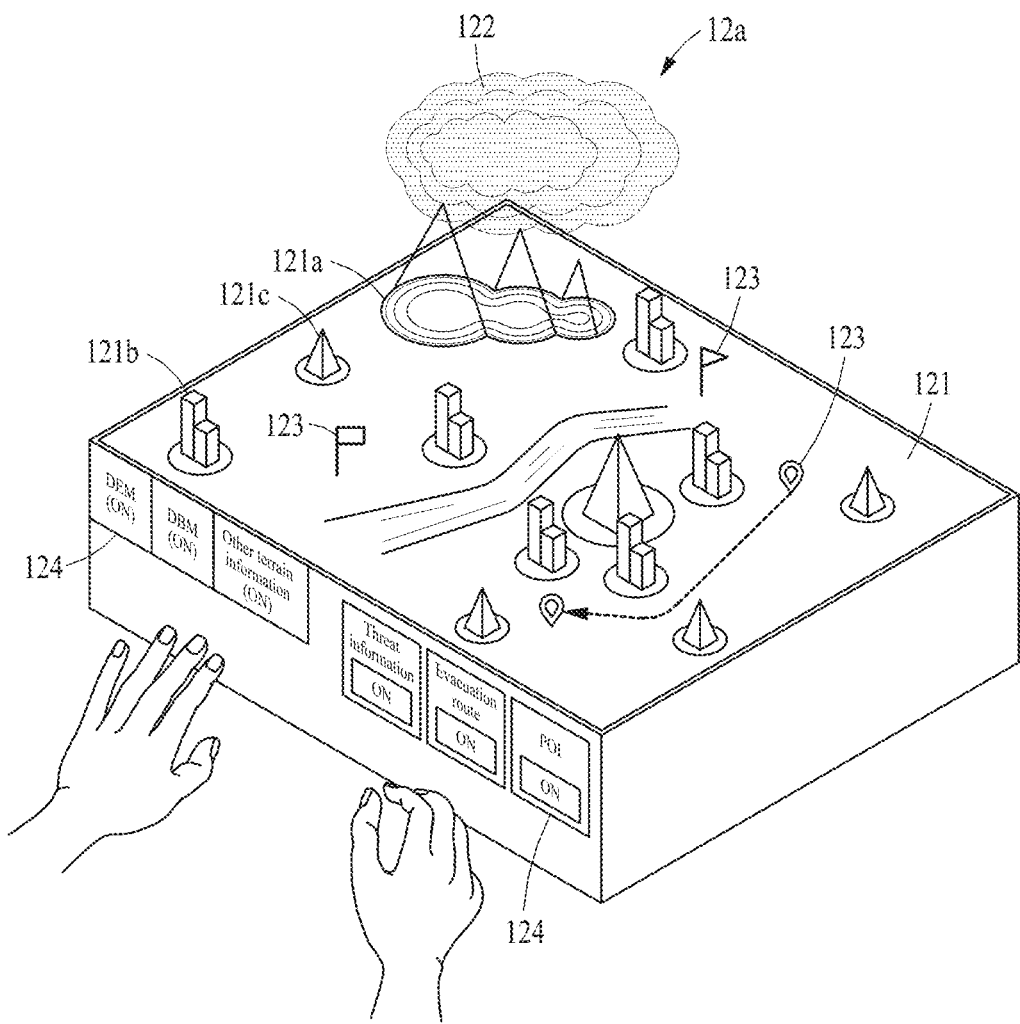
FIG. 3 is a diagram schematically illustrating a configuration in which a user interacts with 3D output information in a 3D extended reality environment according to an embodiment.
Figure 4:
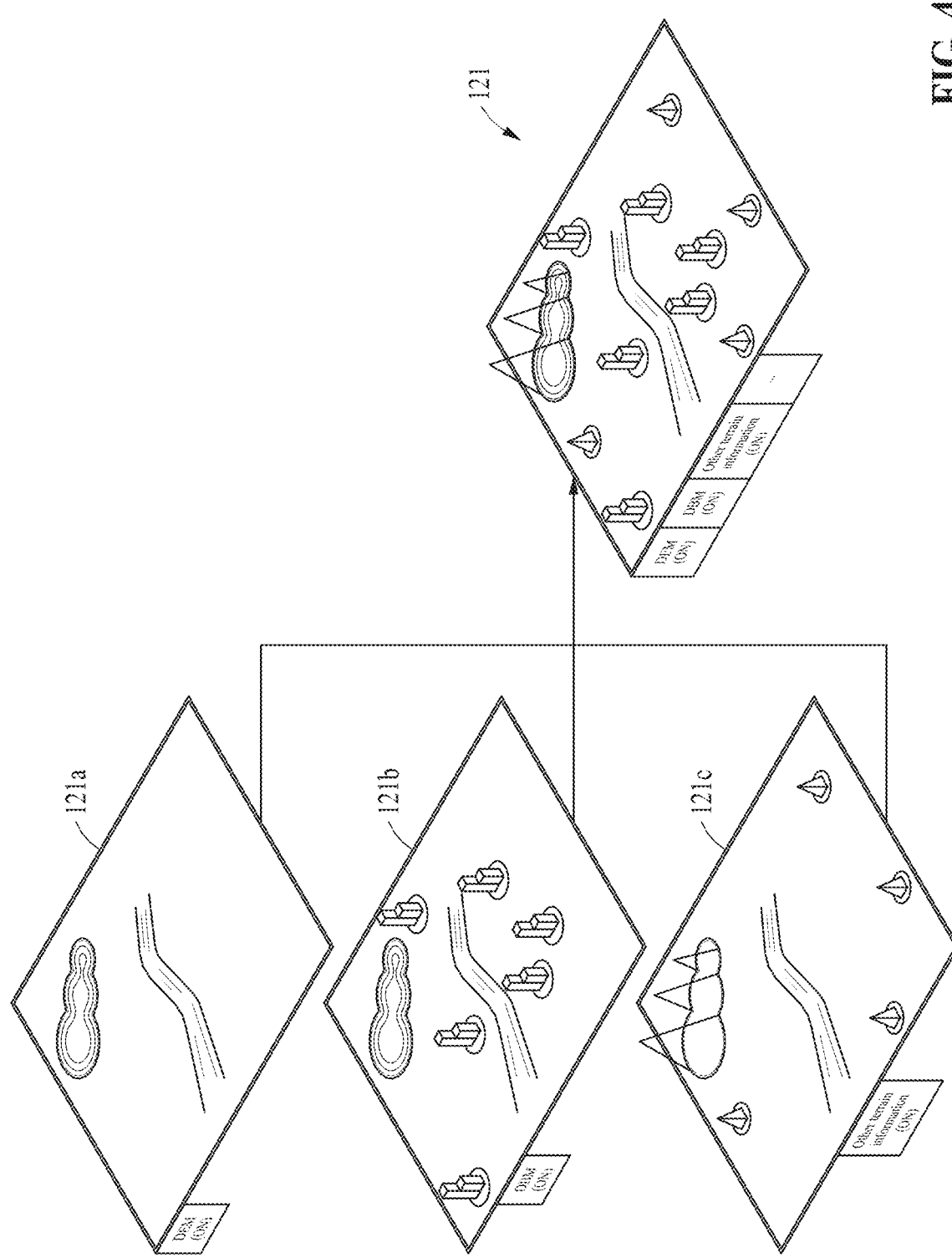
FIG. 4 is a diagram illustrating a configuration of a 3D rendering map according to an embodiment.
Figure 5:
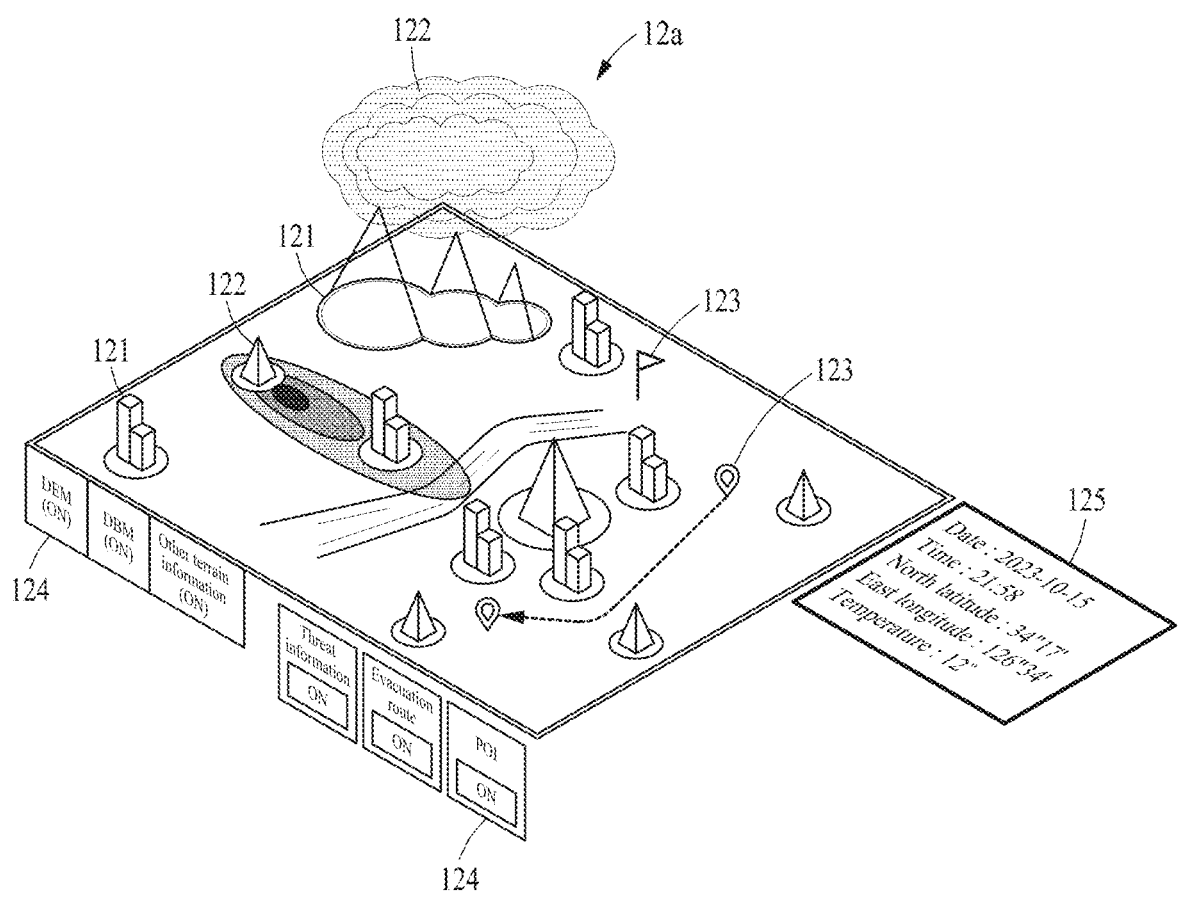
FIG. 5 is a diagram illustrating 3D output information implemented in a 3D extended reality environment according to an embodiment.
Figure 6:
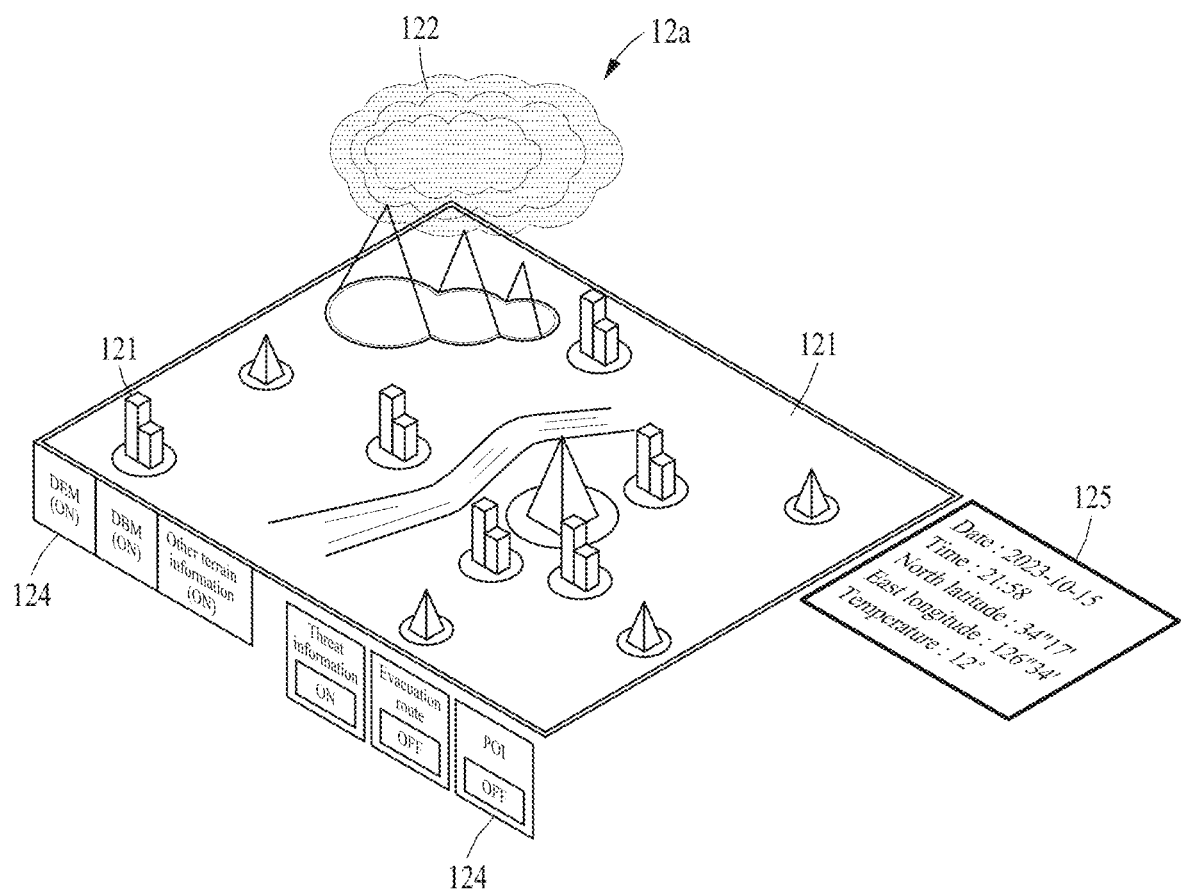
FIG. 6 is a diagram illustrating 3D output information implemented in a 3D extended reality environment according to an embodiment.
Figure 7:
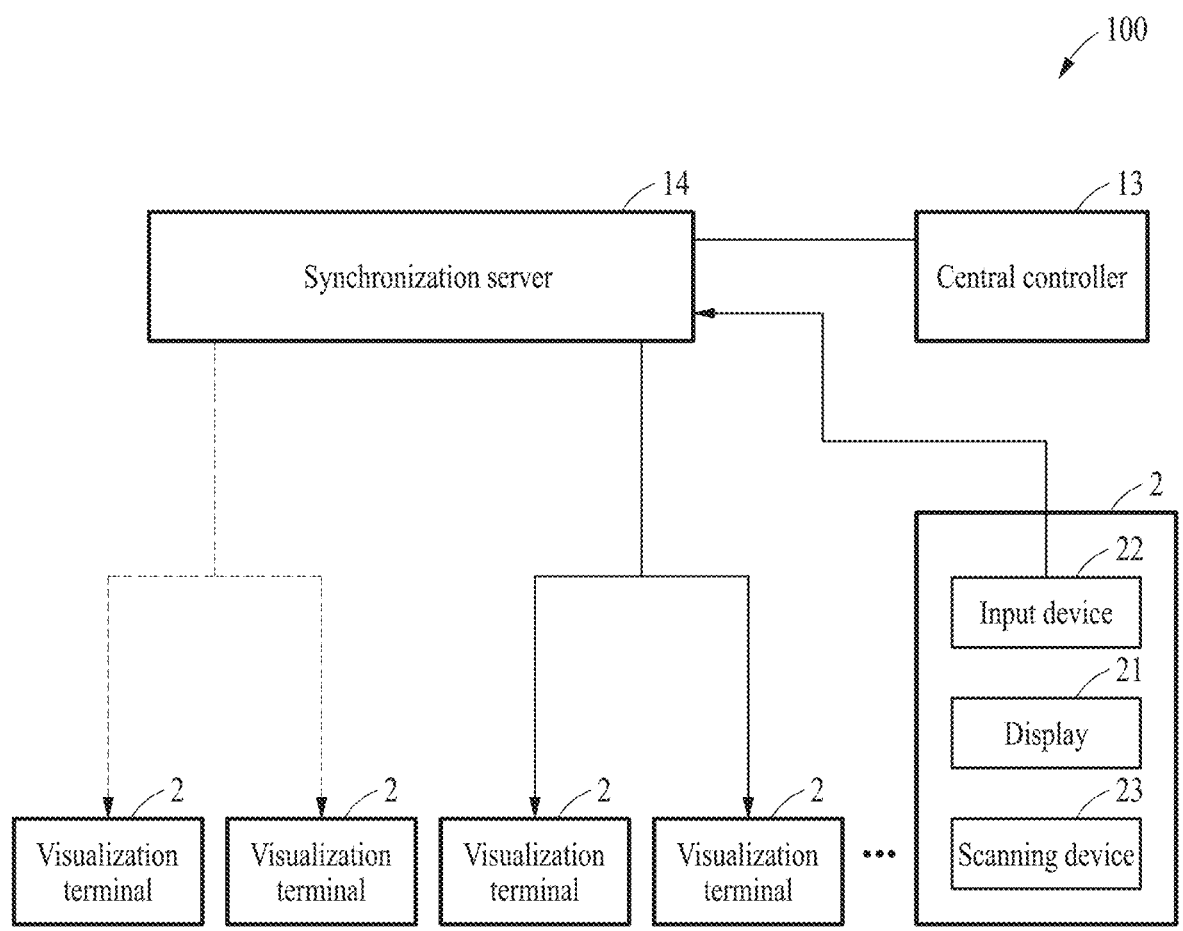
FIG. 7 is a block diagram illustrating a synchronization configuration of a visualization terminal according to an embodiment.

FIG. 1 is a block diagram of a 3D visualization system for a complex hazard according to an embodiment, FIG. 2 is a diagram schematically illustrating a configuration of a 3D visualization system for a complex hazard according to an embodiment, FIG. 3 is a diagram schematically illustrating a configuration in which a user interacts with 3D output information in a 3D extended reality environment according to an embodiment, FIG. 4 is a diagram illustrating a configuration of a 3D rendering map according to an embodiment, FIG. 5 is a diagram illustrating 3D output information implemented in a 3D extended reality environment according to an embodiment, FIG. 6 is a diagram illustrating 3D output information implemented in a 3D extended reality environment according to an embodiment, and FIG. 7 is a block diagram illustrating a synchronization configuration of a visualization terminal according to an embodiment.

Referring to FIGS. 1 to 7, a 3D visualization system 100 for a complex hazard according to an embodiment may visualize a digital twin model in a 3D extended reality environment 3 in real time by integrating various environments and hazards according to disasters, terrorism, etc., provides an evacuation route, and also visualizes useful auxiliary information such as time, weather information, etc. in a 3D space, thereby achieving effective situation recognition and implementation of command and control.

The 3D visualization system 100 for the complex hazard according to an embodiment relates to a system for implementing 3D intuitive visualization of a dangerous situation such as fine dust, disasters, chemical, biological, and radiological threats, terrorism, and the like. A digital twin model is output into the 3D extended reality environment 3 through augmented reality (AR), mixed reality (MR), and extended reality (XR) technologies, various pieces of useful information such as pollution concentration data or an appropriate evacuation route in a 3D form for each dangerous material are implemented by a data layer manner, data desired by a user may be selected, as necessary, selected information may be implemented as a virtual object in real time, and intuitive 3D visualization for dangerous situations is performed in the 3D extended reality environment 3 that is combined with the real world. This may be simultaneously shared with an associated visualization terminal 2, thereby smoothly performing evacuation and response to the complex hazard.

The 3D visualization system 100 for the complex hazard according to an embodiment may include a central server system 1 which collects and process 3D map information 111 and complex hazard information 112 and provides 3D output information 12a which is rendered three-dimensionally, and the visualization terminal 2 which is capable of communicating with the central server system 1 and visualizes the 3D output information 12a on the 3D extended reality environment 3.

The central server system 1 may include a digital twin generator 11 which configures or maintains chemical, biological, and radiological digital twin models corresponding to real terrain and a polluted environment, a graphic information processor 12 which generates 3D output information 12a modeled as 3D graphics based on information generated through the digital twin generator 11, a synchronization server 14 which shares and provides the 3D output information 12a to the visualization terminal 2, and a central controller 13 which sets and controls the 3D output information 12a and shares the same 3D extended reality environment 3 with the remote visualization terminal 2.

The 3D extended reality environment 3 may be an environment of extended reality in addition to the VR, AR, or MR in which the 3D output information 12a is output to a user of the central controller 13 or the visualization terminal 2. For example, as shown in FIG. 2, the user of the visualization terminal 2 may confirm the 3D output information 12a including a 3D rendering map 121 rendered three-dimensionally on the 3D extended reality environment 3 and a hazard information overlay 122 through each display 21.

For example, the 3D extended reality environment 3 may include a virtual space shared by at least some of users of the central controller 13 and a plurality of visualization terminals 2.

The digital twin generator 11 may configure or maintain a digital twin model corresponding to a real environment by integrating the 3D map information 111 including 3D terrain and building information, and the complex hazard information 112 collected in relation to an environment of a temperature, humidity, air pollution, water pollution, radioactive pollution, a chemical material, etc., and at least one or more pollutants among hazards using various sensors and data source.

For example, the 3D map information 111 may include a digital elevation model (DEM) showing only elevation of the terrain, a digital building model (DBM) showing only building information, and a digital surface model (DSM) which is ground surface data including vegetation information.

In this case, the digital twin generator 11 may configure independent data layer for each of detailed information in the 3D map information 111.

For example, the digital twin generator 11 may generate a computational fluid dynamics-based pollution prediction model 113 based on the 3D map information 111 and the complex hazard information 112, so that progress of spread, movement, or scaling of pollutant elements over time may be applied to the digital twin model.

For example, the digital twin generator 11 may calculate the spread of pollution using a flow and meteorological environment equation, and this may configure an independent "pollution information data layer" together with observation information.

For example, the digital twin generator 11 may operates a prediction simulation for local or macroscopic spread of pieces of received complex hazard information together with the 3D map information 111, and apply predicted result values to the digital twin model.

For example, the digital twin generator 11 may calculate the spread of hazards using the flow and meteorological environment equation and this may configure independent data layer together with observation information.

For example, the complex hazard information 112 may include at least one or more pieces of pollution information of fine dust, yellow dust, chemical, biological, and radiological pollution, earthquakes, and toxic gases from fire.

For example, the complex hazard information 112 may obtain hazard information data from a sensor and a detector at each location.

For example, the digital twin generator 11 may configure data layers which are classified according to each type or similarity for each detailed information of the complex hazard information 112.

The graphic information processor 12 may generate the 3D output information 12a to be visualized in the 3D extended reality environment 3 based on the digital twin model including the 3D map information 111, the complex hazard information 112, and the pollution prediction model 113.

For example, the 3D output information 12a may include the 3D rendering map 121 modeled based on the 3D map information 111, the hazard information overlay 122 overlaid and output onto the 3D rendering map 121 based on the complex hazard information 112 and the pollution prediction model 113, a control information overlay 123 overlaid and output onto the 3D rendering map 121 to be identifiable based on control information generated through the central controller 13, a user interface (UI) 124 configured for a user to interact with other pieces of 3D output information in the 3D extended reality environment 3, and an auxiliary information overlay 125 displaying auxiliary information such as time, directions, weather information, or a temperature.

For example, as shown in FIG. 4, the 3D rendering map 121 may generate a graphic image layered for each of terrain elevation information 121a (DEM), building information 121b (DBM), and ground surface information 121c (DSM), thereby providing an image of the 3D rendering map 121 selected for each layer to the user of the central controller 13 or the visualization terminal 2.

The hazard information overlay 122 may display physical distribution information according to locations, scale, or shape of pollutant elements for each type of the pollutant elements in the complex hazard information 112 on the 3D rendering map 121 to be identifiable.

In a 3D visualization expression method of the hazard information overlay 122, the hazard information overlay 122 may be output onto the 3D rendering map 121 by a method of a heatmap, 3D bubble chart, 3D stream plot, 3D Voronoi diagram, or 3D surface plot, and a data expression optimization process may be performed by an appropriate method according to the characteristics of each hazard.

For example, the hazard information overlay 122 may express concentration values through color differences so that hazardous zone radii and hazardous zones in the air or on the ground are identifiable for each stage according to a degree and location of pollution.

For example, the graphic information processor 12 may generate individual graphic images divided and layered according to the type or similarity of the complex hazard information 112, and display the hazard information overlay 122 according to a hazard selected for each layer on the 3D rendering map 121.

The control information overlay 123 is graphic information in which a safe route, an evacuation route, or a point of interest (POI) is displayed to be identifiable on the 3D rendering map 121.

The UI 124 may include a manipulation setting layer for the user of the central controller 13 or the visualization terminal 2 to provide manipulation of enlargement, reduction, rotation, or movement of the 3D output information 12a in the 3D extended reality environment 3, and an information setting layer for controlling the operation of the 3D output information 12a or the setting of the data layer.

For example, the information setting layer may be activated only by the user of the central controller 13, that is, an administrator.

The auxiliary information overlay 125 may include texts or images including auxiliary information such as location information or the like of the visualization terminal 2 in addition to the time, directions, and weather information.

The digital twin generator 11 and the graphic information processor 12 may configure a data layer based on each type and similarity with respect to each of the 3D map information 111 and the 3D rendering map 121, and the complex hazard information 112 and the hazard information overlay 122.

The above structure is a hierarchical data structure used to store and manage data, and it may be implemented by a method of activating/overlaying only desired information by labelling each information in order to increase real-time performance of information providing in a multi-party complex disaster visualization system using a digital twin.

The central controller 13 may set or manipulate the 3D output information 12a to be output through the 3D extended reality environment 3, and share the 3D extended reality environment 3 and the 3D output information 12a with the visualization terminal 2.

For example, the central controller 13 may include a central outputter 132 that outputs the 3D output information 12a, and a central inputter 131 for setting and operating the 3D output information 12a.

For example, the central outputter 132 may output the 3D output information 12a onto the 3D extended reality environment 3 implemented in the AR/MR/XR environment for the user.

For example, the user of the central controller 13 may have a visualization environment in which the same 3D output information 12a is output as the user of the visualization terminal 2.

For example, the central controller 13 may share the 3D extended reality environment 3 having the same 3D visualization environment according to the type or environment of the display 21 of the visualization terminal 2.

For example, the central controller 13 may share situation information in the same 3D visualization environment with the user of the visualization terminal 2, and receive manipulation information of the users of the visualization terminals 2.

For example, the central controller 13 may selectively set a layer configuration of the 3D rendering map 121 to be output in the 3D extended reality environment 3.

For example, the central controller 13 may set graphic images to be selectively displayed on the 3D rendering map 121, the graphic images being layered for each of the terrain elevation information (DEM), building information (DBM), and ground surface information (DSM).

For example, as shown in FIG. 3, the central controller 13 may control ON/OFF of output of image information for each layer of the 3D rendering map 121 through the UI 124.

For example, the central controller 13 may select the hazard information overlay 122 to be overlaid and output in the 3D extended reality environment 3 among pollutant elements in the complex hazard information 112.

For example, the central controller 13 may directly generate/input control information for each of one or more visualization terminals 2 to set route information or a main POI for each of the visualization terminals 2.

For example, in a situation of chemical, biological, and radiological terrorism, the user of the central controller 13 may configure the 3D output information 12a by selecting only the hazard information overlay 122 and the building information (DBM) according to the chemical, biological, and radiological terrorism.

The central controller 13 may set stepwise hazard zone information, and the control information including safe route and dangerous route information or evacuation route information according to a degree and location of pollution based on the 3D map information 111, the complex hazard information 112, and the pollution prediction model 113.

For example, the central controller 13 may perform an optimization process to configure the 3D output information 12a. For example, since it aims to rapidly share information on threat information, the central controller 13 may transmit the 3D output information 12a having a resolution optimized according to a network/output environment or specification of each visualization terminal 2.

For example, the central controller 13 may serve to suggest a solution based on information from the outside and results derived from internal simulation.

For example, the central server system may receive both terrain and pollution information within a country or local area. Based on this, the central controller 13 may derive the safest place from the threat, and generate the control information including a movement path for moving from each location to a corresponding safe zone based on the safest place. Through this, the data layer may also be constructed based on a starting point and a target point on each location.

For example, the evacuation route may be calculated by a method of adding a pollution concentration over time to a general navigation route recommendation algorithm and considering the pollution concentration as a variable.

For example, the central controller 13 may set separately grouped layer data by selecting existing buildings with shelters in an urban area, calculate the control information including an optimal evacuation route or evacuation point based on the terrain information and hazard information, and display this on the 3D rendering map 121 as the control information overlay 123.

The synchronization server 14 may provide the 3D output information 12*a* or the 3D extended reality environment 3 set through the central controller 13 to the visualization terminal 2.

For example, the central controller 13 may directly generate/input the control information to be transmitted to the plurality of visualization terminals 2 to assign various pieces of control information and jobs such as jobs, control, and routes for each of different visualization terminals 2.

For example, the administrator of the central controller 13 may select only a particular object of interest among the 3D output information 12*a* to add and correct it according to intention, and select only a data layer to be output from each of the 3D rendering map 121, the hazard information overlay 122, or the control information overlay 123.

For example, the central controller 13 may set the 3D output information 12*a* to be output through at least some visualization terminals 2 set among the plurality of visualization terminals 2, differently from the 3D output information 12*a* to be output through other visualization terminals 2.

For example, the central controller 13 may process synchronization of communication information transmitted and received between the visualization terminals 2 through the synchronization server 14, and update information set in the visualization terminal 2 to a database by allowing a user input of the set visualization terminal 2, as necessary.

For example, the central controller 13 may receive information from the synchronization server 14 in relation to a multi-party cooperative operation, and display it on the central outputter 132.

For example, the users of the plurality of visualization terminals 2 may each manipulate the 3D output information 12*a*, and the central controller 13 may share all the corresponding manipulation information and simultaneously perform overall management.

For example, the synchronization process may be divided into an "information synchronization" process of sharing the 3D map information, the complex hazard information, control information, and the like, and a "manipulation synchronization" process of sharing manipulation information such as selection (ON/OFF), enlargement/reduction, rotation, and movement of each 3D output information to be visualized.

In the information synchronization process, the 3D rendering map 121 and pollution information, that is, hazard information overlays 122 configured thereon need to be continuously updated to provide these to a system user, and systematic information providing and continuous updating need to be ensured to provide optimal results and conclusion.

The manipulation synchronization process integrates the manipulation information of users of the visualization terminals 2 and shares it with each other, thereby providing two-way communication for smooth understanding. This may be transmitted to the central controller 13 and uploaded to the central outputter 132.

Additionally, in the manipulation synchronization process, independent use by each individual user needs to be ensured, unlike the information synchronization process. In a case where a map is enlarged and observed in advance for personal confirmation, before exchanging opinions to derive results, if the enlarged map information is shared, it may cause discomfort of each other's vision at the time of confirming information.

Therefore, the user of each visualization terminal 2 may disconnecting two-way communication and independently manipulate information, thereby preemptively confirming points or questions missed by other users and positively affecting when deriving results. This is referred to as an independent manipulation environment and an individual user may select it.

Synchronization linkage may prevent generation of duplicate data by integrating different devices, data, and networks.

For example, the user of the visualization terminal 2 generally has no choice but to unilaterally view only a screen information according to the manipulation of the central controller 13. However, as shown in FIG. 7, when the central controller 13 grants manipulation authority to a specific visualization terminal 2, the manipulation information of the corresponding visualization terminal 2 may be shared with users of some other visualization terminals 2, and a group in which the 3D output information 12*a* is shared may be flexibly set.

The above manipulation information may be a set of free manipulation information such as enlargement/reduction/rotation/movement, and selection of an information layer for the user of the visualization terminal 2 to closely check a map and other contents configured in the 3D output information 12*a*.

At this time, although the screen manipulation is possible with an internal function of the visualization terminal 2, an input device 22 including an auxiliary controller (a personal computer (PC), tablet, joystick, haptic sensor, button, etc.) may be additionally connected and used for convenience of each user.

For example, if a fire breaks out in a specific area, the shape of the fire spreading and the shape of the smoke must be updated at specific times to obtain a base to suggest an optimal solution based on seamless information check.

Therefore, in order for the users of the visualization terminals 2 which has received the information to smoothly check the extent of the fire and location of the fire in the map and content information, when a particular user enlarges the map, other users may share a process and result of the enlargement with each other, and this may also be shared with the central outputter 132 of the central controller 13. If a user of another visualization terminal 2 rotates the map, the map and content may be rotated in a visualization screens of other users.

Meanwhile, when the central controller 13 grants input authority to a particular visualization terminal 2, the corresponding visualization terminal 2 may be authorized to access and correct pollution, threats, the evacuation route, the map, and weather information in addition to the 3D output information 12*a*. In this case, as shown in FIG. 7, the user of the corresponding visualization terminal 2 may be able to control/set the 3D output information 12*a* and internal information of the central server system 1 through the input device 22 or the UI 124 on the 3D extended reality environment 3.

The internal information of the central server system 1 may be pieces of information such as geographical information, a threat level, and the like that occur or may occur in an actual field, and may be continuously updated to configure information displayed on a 3D visualization screen.

According to the above structure, the central controller 13 may, if necessary, configure a single manipulation environment in the set visualization terminal 2, or configure a multi-party cooperative operation environment capable for cooperative operation for each group of the set visualization terminals 2. When the single manipulation environment is configured and used, it may confuse the users, and therefore, the central controller 13 may control the authority to configure the single manipulation environment, if necessary.

For example, the 3D visualization system 100 for the complex hazard may be configured with the multi-party cooperative operation system capable for individual manipulation and cooperative operation of the central controller 13 which controls manipulation information, and the visualization terminals 2.

For example, the visualization terminals 2 in the system are all connected wirelessly and may receive and share information with each other.

The visualization terminal 2 may be carried or worn by a remote user. For example, the visualization terminal 2 may be capable of communicating with the central server system 1 and other visualization terminals 2.

For example, the visualization terminal 2 may visualize the 3D extended reality environment 3 configured with XR in addition to the VR, AR, or MR to the user.

For example, the visualization terminal 2 may include the display 21 for outputting the 3D output information 12*a* and the 3D extended reality environment 3 to the user, the input device 22 for receiving manipulation of the user, and a scanning device 23 capable of scanning and recognizing a surrounding situation of the visualization terminal 2 and a user's hand.

The display 21 may be installed on the visualization terminal 2 and output the 3D output information 12*a* transmitted and received to and from the central server system 1. For example, the display 21 may output the 3D output information 12*a* within the 3D extended reality environment 3 configured with AR/MR/XR.

For example, through the display 21, the user may view various overlay images including the 3D rendering map 121 output in the 3D extended reality environment 3 and the hazard information overlay 122 overlaid and displayed thereon as a bird's-eye view.

For example, the user of the visualization terminal 2 may recognize/interact with a user of another visualization terminal 2 communicating with the central server system 1 and a user (administrator) of the central controller 13 in the same 3D extended reality environment 3, and view 3D terrain and pollution information according to the same 3D extended reality environment 3 as if they are in the same space.

For example, the user of the visualization terminal 2 may recognize the surrounding environment and the user's hand through the scanning device 23, freely manipulate a map and various objects with the user's hands through this, and recognize manipulation commands such as enlargement, reduction, rotation, and movement of a screen of the user.

For example, when the plurality of visualization terminals 2 among the visualization terminals 2 belonging to a synchronized environment are positioned in relatively adjacent spaces, the 3D output information 12*a* may be displayed on the same 3D coordinates in the 3D extended reality environment 3 based on relative position information between the plurality of visualization terminals 2.

The input device 22 is a device that is manipulated by a user to generate an input signal.

For example, the input device 22 may recognize a manipulation command of a user for movement or adjustment of a viewpoint on the 3D extended reality environment 3 or the 3D output information 12*a*.

For example, the input device 22 may be manipulated from the user to transmit specific information to the central server system 1 on the visualization terminal 2 set as needed to generate an input signal.

For example, the input device 22 may include input equipment that may be manipulated by the user, such as a portable auxiliary controller, a portable tablet, a haptic sensor, a joystick, or a mouse.

For example, when a specific visualization terminal 2 is separately authorized to manipulate or input from the central controller 13, information including a manipulation signal or an input signal may be transmitted to or shared with the central server system 1 or other visualization terminal 2.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random-access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The devices described above may be configured to act as one or more software modules in order to perform the operations of the embodiments, or vice versa.

Embodiments have been described above with reference to specific matters such as specific components and limited embodiments and with reference to drawings, but these are provided to facilitate overall understanding. Also, the present disclosure is not limited to the above-described embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. A three-dimensional (3D) visualization system for a complex hazard, the 3D visualization system comprising:
    a central server system configured to collect 3D map information and complex hazard information to generate a 3D extended reality environment that is three-dimensionally rendered; and
    a visualization terminal capable of remotely communicating with the central server system and provided with a display configured to output the 3D extended reality environment,
    wherein the central server system comprises:
    a digital twin generator configured to process the 3D map information comprising 3D terrain and building information, and complex hazard information collected in relation to at least one or more pollutants.

2. The 3D visualization system of claim 1, wherein the central server system further comprises:
    a graphic information processor configured to generate the 3D extended reality environment based on the 3D map information and the complex hazard information processed through the digital twin generator; and
    a central controller configured to set 3D output information to be output through the 3D extended reality environment formed by the graphic information processor, and share the 3D extended reality environment and the 3D output information with the visualization terminal.

3. The 3D visualization system of claim 2,
    wherein the complex hazard information collects at least one or more pieces of pollution information of fine dust, yellow dust, chemical, biological, and radiological pollution, and toxic gases from fire, and
    wherein the digital twin generator is configured to generate a computational fluid dynamics-based pollution prediction model based on the 3D map information and the complex hazard information.

4. The 3D visualization system of claim 3, wherein the central controller is capable of outputting the 3D extended reality environment, and configured to selectively control the 3D output information to be output in the same 3D visualization environment according to an environment of the display of the visualization terminal.

5. The 3D visualization system of claim 4, wherein the 3D output information output in the 3D extended reality environment comprises:
    a 3D rendering map modeled based on the 3D map information;
    a hazard information overlay overlaid and output on the 3D rendering map based on the complex hazard information and the pollution prediction model; and
    a user interface (UI) output in the 3D extended reality environment to interact with other pieces of 3D output information.

6. The 3D visualization system of claim 5, wherein the hazard information overlay displays a physical distribution of pollutant elements as 3D graphics on the 3D rendering map for each type of the pollutant elements in the complex hazard information.

7. The 3D visualization system of claim 6, wherein the central controller is configured to select the hazard information overlay overlaid to be output in the 3D extended reality environment among the pollutant elements in the complex hazard information.

8. The 3D visualization system of claim 5, wherein the central controller is configured to divide the 3D output information according to similarities and add each of the 3D output information in the unit of layers, and control each layer to be selectively output in the 3D extended reality environment.

9. The 3D visualization system of claim 5, wherein the UI comprises:
    an input layer configured to enable output of the 3D rendering map or the hazard information overlay in the 3D extended reality environment and enable enlargement, reduction, rotation, and movement of the 3D output information in the 3D extended reality environment.

10. The 3D visualization system of claim 5,
    wherein the central controller is configured to generate control information comprising stepwise hazard zone information according to a degree and a location of pollution based on the 3D map information, the complex hazard information, and the pollution prediction model, and
    wherein the 3D output information further comprises a control information overlay overlaid to be identified on the 3D rendering map based on the control information.

11. The 3D visualization system of claim 10,
    wherein the control information further comprises route information according to a safe route and a dangerous route on the 3D map information through the central controller, and
    wherein the control information overlay visualizes and outputs a movement path according to the route information on the 3D rendering map.

12. The 3D visualization system of claim 10,
    wherein the central controller is configured to set different pieces of route information to each visualization terminal as the control information, and
    wherein, in the control information overlay output from each visualization terminal, a movement path according to the route information set to each visualization terminal is visualized and output.

13. The 3D visualization system of claim 4, wherein the central controller is configured to set the 3D output information to be output through at least some visualization terminals set among a plurality of visualization terminals differently from 3D output information to be output through other visualization terminals.

14. The 3D visualization system of claim 4, wherein the visualization terminal
further comprises an input device, and is configured to generate manipulation information for selecting, enlarging, reducing, rotating, and moving a type of the 3D output information to be output in the 3D extended reality environment through the input device.

15. The 3D visualization system of claim 14,
wherein the visualization terminal comprises a scanning device configured to recognize a surrounding situation and a user's hand, and
wherein the visualization terminal is configured to generate the manipulation information through the user's hand recognized through the scanning device.

16. The 3D visualization system of claim 4, wherein the central controller is configured to:
perform synchronization so that the 3D output information to be output through some visualization terminals set among a plurality of visualization terminals is shared with each other; and
perform synchronization so that manipulation information input from one of the set some visualization terminals is also applied to remaining visualization terminals.

17. The 3D visualization system of claim 16, wherein a user of the visualization terminal configures an independent manipulation environment by deviating from the synchronization of the manipulation information and not sharing own manipulation information, as needed.

18. The 3D visualization system of claim 16, wherein, when a plurality of visualization terminals among the visualization terminals belonging to a synchronized environment is located in a relatively adjacent space, the 3D output information is output on the same 3D coordinates in the 3D extended reality environment based on relative location information between the plurality of visualization terminals.

19. The 3D visualization system of claim 4,
wherein the visualization terminal is capable of selectively configuring items of pieces of information to be synchronized, configures the 3D extended reality environment based on information set from the central controller using the 3D map information, the complex hazard information, and the 3D output information, and is capable of performing independent manipulation and operation without sharing manipulation information in the 3D extended reality environment.

* * * * *